Nov. 10, 1931.  S. H. HUNT  1,831,304
HAMPER HANDLE
Filed Feb. 15, 1930
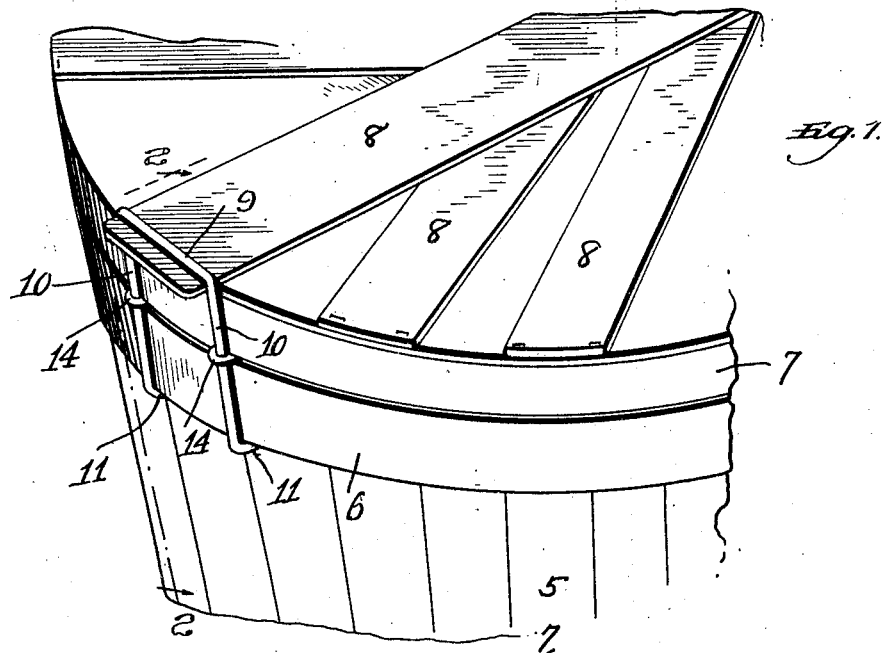
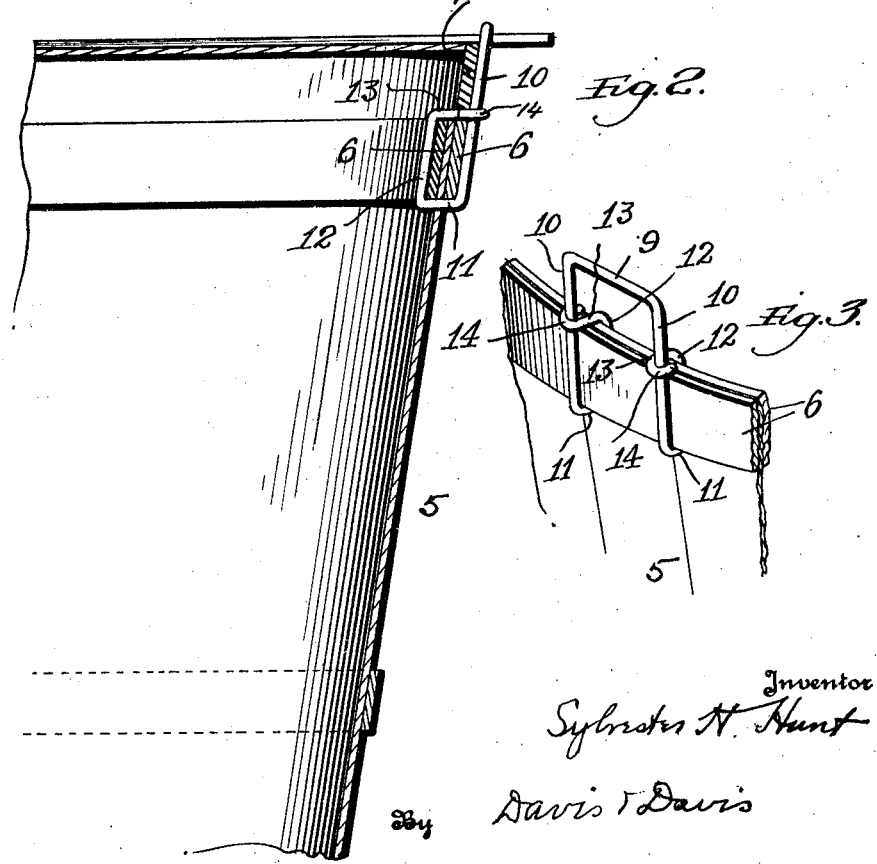
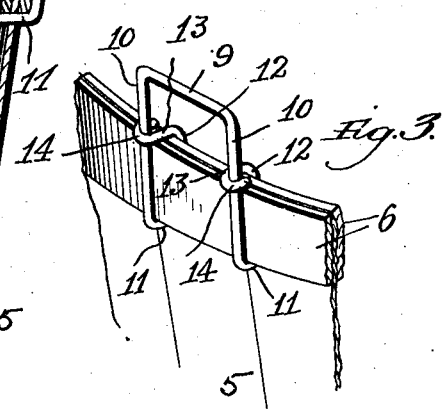
Inventor
Sylvester H. Hunt
By Davis & Davis
Attorneys Patented Nov. 10, 1931

1,831,304

UNITED STATES PATENT OFFICE

SYLVESTER H. HUNT, OF NORFOLK, VIRGINIA, ASSIGNOR TO FARMERS MANUFACTURING COMPANY, OF NORFOLK, VIRGINIA, A CORPORATION OF VIRGINIA

HAMPER HANDLE

Application filed February 15, 1930. Serial No. 428,740.

This invention relates to that type of hamper or basket handle which serves in addition to its function as a handle to fasten the cover in place, and the object of this invention is to provide a simple device which will effectually hold the cover in place and serve, when the cover is detached, as a sturdy handle for the basket, as more fully hereinafter set forth.

In the drawings—

Fig. 1 is a perspective view of a portion of a basket showing my invention applied thereto;

Fig. 2 is a vertical sectional view on the line 2—2 of Fig. 1;

Fig. 3 is a detail perspective view of the handle.

Referring to the annexed drawings by reference-characters, 5 designates the usual stave or splint wall of the basket, whose upper edge is clamped between a pair of hoops 6 by staples in the usual manner. The cover is likewise constructed in the usual manner in that it includes a hoop 7 and slats 8 fastened to the top edge of the hoop 7, one of the slats extending beyond the hoop to engage the handle.

The handle is constructed of a single piece of wire bent to form an upstanding rectangular loop 9, the two depending legs 10 lying against the outer face of the outer hoop of the basket. The extremities of the legs 10 are bent laterally to form bars 11 which extend inwardly through holes in the basket wall and lie hard against the lower edges of both hoops 6; thence the wire legs are extended upwardly to form vertical bars 12 which lie hard against the inner face of the inner loop; thence the wires are bent outwardly to form top members 13 which lie against the top edges of the hoops, the extreme ends of these members 13 being curled to form lateral hooks 14 which engage tightly around the upstanding leg portions 10.

The advantage of the foregoing construction is that I avoid weakening and splitting the hoops by puncturing the same. Also, the loops formed by the members 10, 11, 12 and 13 clamp the double-hoop structure together with the intermediate basket wall and thus not only securely anchor the handle to the basket in such a manner as to prevent it tearing away from the basket due to heavy loads, but also to greatly strengthen the rim of the basket, as is obvious. Furthermore, it will be seen that my construction does away with all projecting ends and thus avoids injury to the persons handling the basket, as well as injury to the fruit or vegetables enclosed in the basket.

It will be understood that by pinching the hooks 14 onto the legs 10, the loops will be tied or bound tightly to the hoop structure, this latter feature being particularly desirable in that it permits a tighter fitting of the cover-hoop 7 than has been possible heretofore with devices of this type.

What I claim as new is:

In combination with a basket having a hoop structure at its rim embodying two hoops clamped upon the intermediate staves, and a cover including a member having its end extended beyond the edge of the cover, a combined cover-fastener-handle consisting of a handle loop adapted to engage over the extended slat and having two depending legs resting against the outer face of the outer hoop of the basket and extended inwardly through the wall of the basket underneath the basket hoops, thence upwardly to the top edges of the hoops and lying against the inner face of the inner hoop, thence outwardly over the top edges of the hoops and the basket wall, the extreme ends of these outwardly-extending members being curled into hook form and engaged around the aforesaid depending leg members to create a tensional strain in the said outwardly extending members to thereby form a pair of loops which tightly clamp the pair of hoops and the intermediate basket wall.

In testimony whereof I hereunto affix my signature.

SYLVESTER H. HUNT.